R. LUECK.
BELT COUPLING.
APPLICATION FILED JUNE 4, 1921.

1,409,873.

Patented Mar. 14, 1922.

Robert Lueck
INVENTOR

BY Victor J. Evans
ATTORNEY

WITNESS:

UNITED STATES PATENT OFFICE.

ROBERT LUECK, OF BLOOMER, WISCONSIN.

BELT COUPLING.

1,409,873.   Specification of Letters Patent.   Patented Mar. 14, 1922.

Application filed June 4, 1921. Serial No. 474,921.

*To all whom it may concern:*

Be it known that I, ROBERT LUECK, a citizen of the United States, residing at Bloomer, in the county of Chippewa and State of Wisconsin, have invented new and useful Improvements in Belt Couplings, of which the following is a specification.

My present invention has reference to a means for connecting the ends of pulley belts.

An object of the invention is to produce a means for connecting the ends of power belts which is in the nature of expansible pins, permitting the proper yielding of the belt ends incident to certain strains to which they are subjected, obviating the necessity of belt tighteners, and permitting the belt to be employed with equal efficiency either in or outdoors without liability of affection to weather conditions.

It is a further object to produce a connecting or coupling means for the ends of a power belt which shall be of a comparatively simple construction, easily connected to the ends of a belt, and when secured thereon materially reinforcing the said ends, one in which the belt is permitted to yield in an outward direction at the ends thereof, as when the same is passing over the pulley, and also one in which the belt is susceptible to longitudinal expansion, but is normally retained in a position whereby the ends of the said belt are in contacting relation, the means for accomplishing the expansion and the contraction of the belt being adjustable.

The foregoing, and other objects which will appear as the nature of the invention is better understood, may be accomplished by a construction, combination and operative association of parts, such as is disclosed by the drawings which accompany and which form part of this specification.

In the drawings:—

Figure 1:
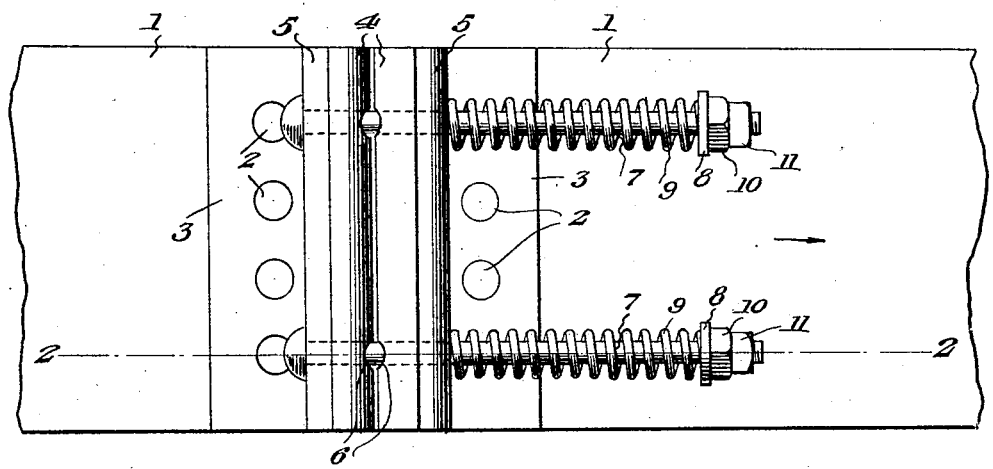
Figure 1 is a plan view of a belt having its ends coupled in accordance with this invention.
Figure 2:
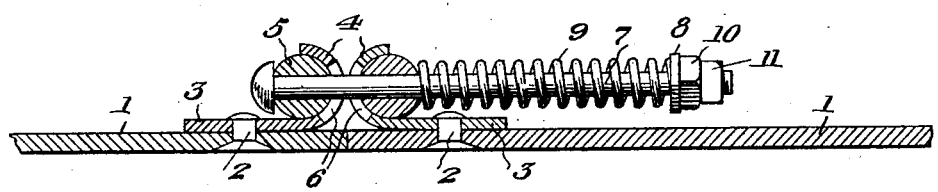
Figure 2 is a sectional view approximately on the line 2—2 of Figure 1.
Figure 3:
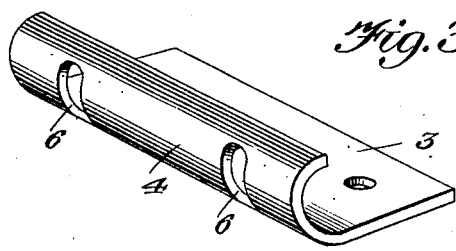
Figure 3 is a perspective view of one of the hinged plates employed.

Referring now to the drawings in detail, the ends of a power imparting belt are indicated by the numeral 1 respectively. On their outer faces, the said ends have secured thereto by rivets 2 flat plates 3. The plates are approximately equal in length to the width of the belt, and the rivets being directed from the inner face of the belt have their heads embedded in the belt. The plates 3, at their confronting ends are bent upon themselves to provide inwardly directed curved lips 4 which may be in contacting engagement when the belt ends are brought against each other.

In each of the lips there is a metal roller 5, and passing through aligning openings in the rollers and also elongated openings 6 in in the lipped portions of the plates 3, are bolts 7. The bolts are somewhat elongated, the heads thereof being in contacting engagement with the outer surface of one of the rollers 5, the shanks of the bolts having arranged thereon washers 8 which are in contact with the outer convolutions of helical springs 9 that are arranged on the said bolts. The washers 8 are engaged by nuts 10, the said nuts in turn being engaged by lock nuts 11.

The belt travels in the direction of the arrow in Figure 1 of the drawings. By adjusting the nuts, the tension of the springs may be regulated. The coupling or connection between the belt ends provides what may be termed a hinge connection, the same permitting the belt ends to be swung inwardly, as for instance when the belt is traveling around a pulley, but holding the belt ends from outward movement. The tension of the springs, as will be apparent, may be adjusted by regulating the nuts on the bolts. The springs permit of the expansion of the belt ends, but normally hold the same in contacted condition. The construction obviates the necessity of employment of the ordinary belt tighteners, and incident to the adjustability of the coupling, the belt may be employed on outdoor work as well as indoor.

Having described the invention, I claim:—

1. In a means for connecting the ends of a power belt, plates secured to the ends of the belt, and spring influenced means connecting the plates in a manner to permit of the expansion of the belt ends and an angular relation of one belt end to the other in one direction only.

2. The combination with the ends of a power belt, of means for connecting said ends, comprising plates secured to the ends of the belt, said plates having rounded lips on their confronting ends, roller members in the lips, means passing through the roller members and freely through the lips, and adjustable spring means on said last mentioned means in contacting engagement with one of the roller members.

3. The combination with the meeting ends of a power belt, of means for coupling said ends, comprising plates riveted to the belt ends, said plates having confronting ends provided with oppositely rounded lips each of which having elongated slots therethrough, a roller in each of the lips bolt members passing through the rollers and through the openings in the lips, a spring on each bolt, and means adjustably retaining the springs on the bolts.

In testimony whereof I affix my signature.

ROBERT LUECK.